US009479498B2

United States Patent
Kohlenberg et al.

(10) Patent No.: US 9,479,498 B2
(45) Date of Patent: Oct. 25, 2016

(54) PROVIDING LIMITED ACCESS TO A SERVICE DEVICE VIA AN INTERMEDIARY

(71) Applicant: Intel Corporation, Santa Clara, CA (US)

(72) Inventors: Tobias Kohlenberg, Portland, OR (US); Steven Birkel, Portland, OR (US); Rita Wouhaybi, Portland, OR (US); Stanley Mo, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 681 days.

(21) Appl. No.: 13/631,293

(22) Filed: Sep. 28, 2012

(65) Prior Publication Data

US 2014/0091900 A1  Apr. 3, 2014

(51) Int. Cl.
    *G05B 19/00* (2006.01)
    *H04L 29/06* (2006.01)
    *G08C 17/02* (2006.01)
    *H04W 12/06* (2009.01)
    *G07C 9/00* (2006.01)
    *H04L 29/08* (2006.01)

(52) U.S. Cl.
    CPC ....... *H04L 63/0853* (2013.01); *G07C 9/00309* (2013.01); *G07C 9/00857* (2013.01); *G08C 17/02* (2013.01); *H04L 63/0807* (2013.01); *H04W 12/06* (2013.01); *G08C 2201/40* (2013.01); *H04L 67/12* (2013.01)

(58) Field of Classification Search
    CPC .......... G08B 21/0208; G08B 21/0202; G08B 25/016; B60R 25/24; B60R 25/102; B60R 25/2009; B60R 2325/205
    USPC ........... 340/5.7–5.72, 12.22, 426.13–426.17, 340/539.14–539.15, 5.1, 426.35, 426.36
    See application file for complete search history.

(56) References Cited

U.S. PATENT DOCUMENTS

| 6,978,023 | B2 | 12/2005 | Dacosta | |
|---|---|---|---|---|
| 7,606,558 | B2 * | 10/2009 | Despain | G07C 9/00023 340/5.73 |
| 2008/0252415 | A1 * | 10/2008 | Larson | G07C 9/00309 340/5.73 |
| 2011/0109433 | A1 * | 5/2011 | Kuenzi | G06Q 30/04 340/5.73 |
| 2012/0126976 | A1 * | 5/2012 | Bugenhagen | G08B 25/08 340/540 |

FOREIGN PATENT DOCUMENTS

| EP | 2178271 A1 | 4/2010 |
|---|---|---|
| WO | 0231778 A1 | 4/2002 |
| WO | 2007126375 A1 | 11/2007 |

OTHER PUBLICATIONS

Jiang et al.,"IEEE 802.11p: Towards an International Standard for Wireless Access in Vehicular Environments", Vehicular Technology Conference, VTC Spring 2008, IEEE, held in Singapore on May 11-14, 2008, pp. 2036-2040.
International Search Report and Written Opinion received for PCT Patent Application No. PCT/US2013/059886 , mailed on Dec. 2, 2013, 10 pages.
International Preliminary Report on Patentability for Patent Application No. PCT/US2013/059886, dated Apr. 9, 2015, 7 pages.
European Search Report for EP Patent Application No. 13842884.2, mailed on May 27, 2016, 7 pages.

* cited by examiner

*Primary Examiner* — George Bugg
*Assistant Examiner* — Sharmin Akhter
(74) *Attorney, Agent, or Firm* — Jordan IP Law, LLC (57) ABSTRACT

Systems and methods may provide for brokering limited access to a service device via an intermediary. In one example, the method may include receiving a request communication at a control device including a request for limited access to a service device, wherein the request is received from an intermediary device on behalf of a request device, and transmitting an access communication to the intermediary device, wherein the access communication includes an access ticket to be used by the request device to gain the limited access of the service device.

15 Claims, 6 Drawing Sheets

PROVIDING LIMITED ACCESS TO A SERVICE DEVICE VIA AN INTERMEDIARY

BACKGROUND

Embodiments generally relate to brokering limited access to a service device via an intermediary device. More particularly, embodiments relate to utilizing an intermediary device to field a request for limited access of a service device, and to communicate with a control device to broker the limited access of the service device.

In some cases, access to a service device may be limited only to those possessing a control device. For example, access to a vehicle or other service device may be limited to those with a key (or a control device such as a remote keyless entry device), and control of a garage door may be limited to those in possession of its controller. In some cases, however, access may be required by those not in possession of a control device.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
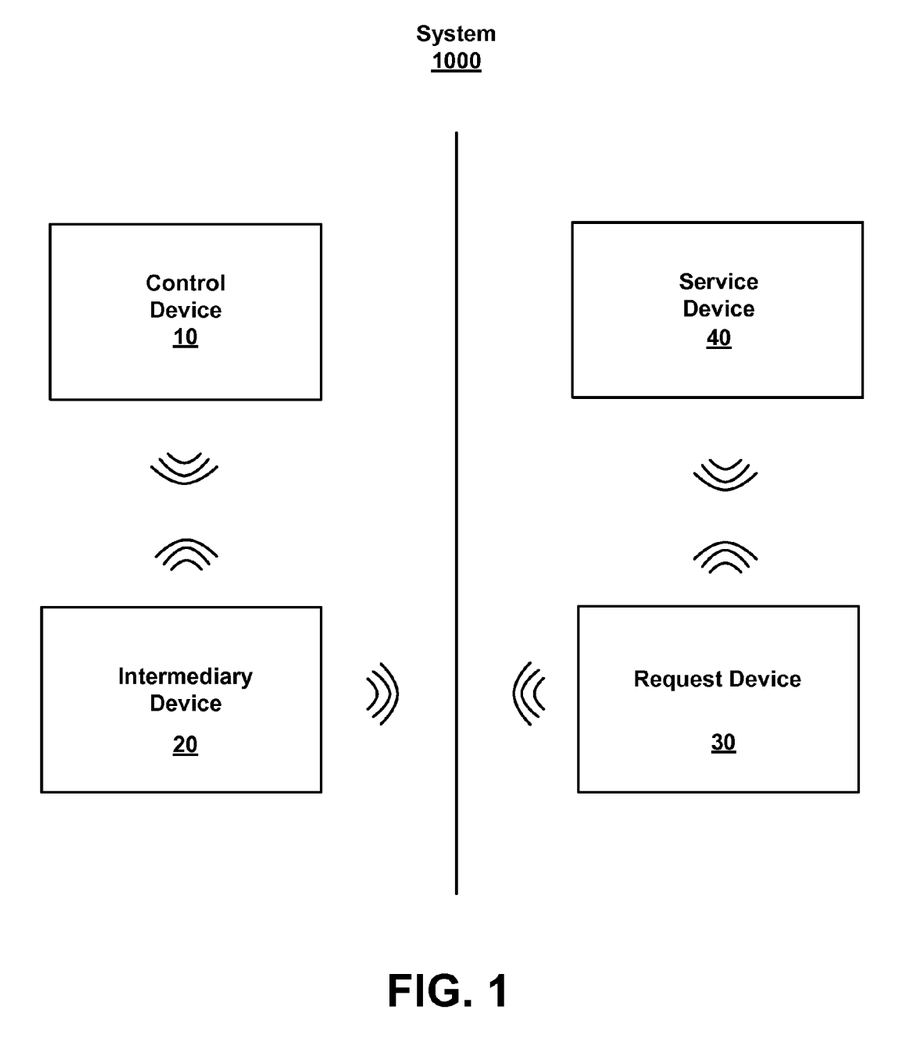
FIG. 1 is a block diagram of an example of a computing system to broker limited access to a service device in accordance with an embodiment of the invention.

Turning now to FIG. 1, a block diagram of a networking architecture 1000 to broker limited access to a service device via an intermediary is shown. The architecture 1000 may include a control device 10, an intermediary device 20, a request device 30, and a service device 40. The control device 10 may be configured to control the service device 40 by communicating with the service device 40 directly. In this example, the intermediary device 20 and the request device 30 may be smart phones, or other mobile devices such as smart tablets, personal digital assistants (PDAs), mobile Internet devices (MIDs), etc., the service device 40 may be a vehicle, and the control device 10 may be a remote keyless entry device that controls the vehicle.

So, for example, a parent may receive a request to use the vehicle (e.g. the service device 40) at the parent's smart phone (e.g., the intermediary device 20), wherein the request may come from her daughter's smart phone (e.g., the request device 30). The parent may then use her smart phone in the role of an intermediary, and may communicate a request (on the daughter's behalf) to the remote keyless entry device (e.g., the control device 10). The remote keyless entry device may return a communication granting limited access, which the parent's phone may transmit to the daughter's smart phone. The daughter's smart phone may then communicate with the vehicle to gain the limited access with or without the control device 10 being present.

Figure 2:
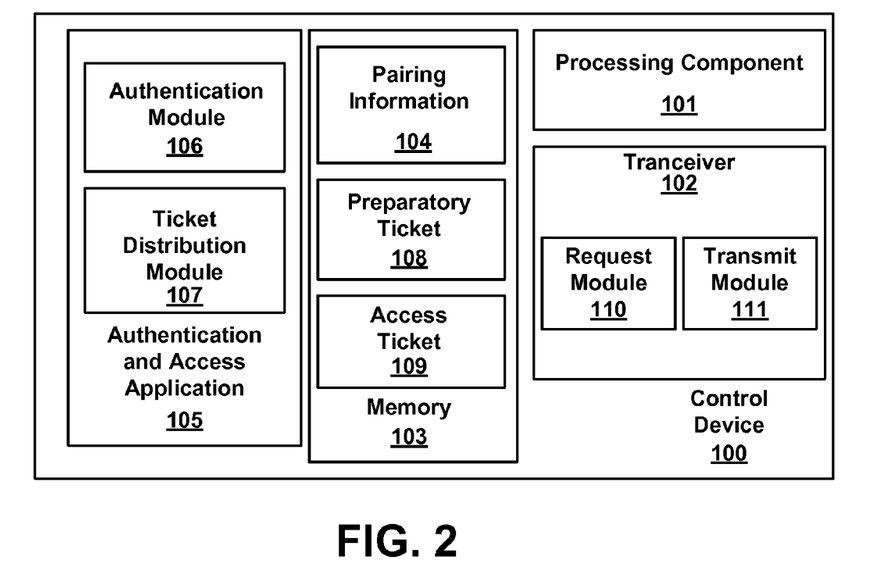
FIG. 2 is a block diagram of an example of an intermediary device in accordance with an embodiment of the invention.

Turning now to FIG. 2, a block diagram of a control device 100 is shown. The control device 100 may be any programmable machine that may carry out a sequence of logical operations to control a service device. In this example, the control device 100 may be a remote keyless entry device for a vehicle. Other examples of the control device 100 may include a laptop, desktop, personal digital assistant (PDA), an electronic garage door opener, any smart device such as a smart phone, smart tablet, smart TV, or the like. The control device 100 may include a processing component 101, a transceiver 102, and a memory device 103. In the illustrated example, the transceiver 102 comprises a request module 110 to receive a request communication that includes a request of limited access of a service device, wherein the request is received from an intermediary device on behalf of a request device. Additionally, the transceiver 102 may comprise a transmit module 111 to transmit an access communication to the intermediary device, wherein the access communication includes an access ticket to be used by the request device to gain the limited access of the service device.

The processing component 101 may include at least one computer processor that may be utilized to execute computer-readable executable instructions. For example, as will be discussed in greater detail, the processing component 101 may be configured to execute various software applications relating to providing limited access to a service device via an intermediary.

The transceiver 102 may be a transmitter/receiver that enables the control device 100 to wirelessly communicate with other devices (e.g., the intermediary device 100). In this example, the transceiver 102 may be configured to communicate via near-field communication (NFC) protocol (e.g., with an intermediary device). The transceiver 102 may also be configured to communicate via Bluetooth (e.g., IEEE 802.15.1-1005, Wireless Personal Area Networks), Zigbee (IEEE 802.15.4), etc.), a cellular telephone connection (e.g., W-CDMA (UMTS), CDMA1000 (IS-856/IS-1000), etc.), a wired data connection (e.g., RS-232 (Electronic Industries Alliance/EIA), Ethernet (e.g., IEEE 802.3-1005, LAN/MAN CSMA/CD Access Method), power line communication (e.g., X10, IEEE P1675), USB (e.g., Universal Serial Bus 2.0 Specification)), etc., depending upon the circumstances.

The memory device 103 may be any device configured to store data. In this case, the memory device 103 may store, among other things, pairing information 104, a preparatory ticket 108, and an access ticket 109.

The pairing information may 104 may include information relating to a pairing process conducted between the control device 100, an intermediary device, such as the intermediary device 20 (FIG. 1), and a service device, such as the service device 40 (FIG. 1). A pairing process may include, among other things, exchanging pairing information (e.g., device identities, etc.) of an intermediary device, a control device, and a service device. The devices may utilize this pairing information to verify a request for limited access, and if appropriate, recognize the intermediary device as an intermediary in a process requesting limited access to a service device.

An authentication and access application 105 may be configured to authenticate the request for limited access of the service device, and upon verification, to provide access to the request device. In this example, the authentication and access application 105 may be a Kerberos-enabled application configured to communicate with an intermediary device and a service device. The Kerberos protocol may be used to, among other things, authenticate access requests (e.g., from the request device 300, FIG. 4), and manage requests and issuance of access tickets that may be used to provide access to a service device. The authentication and access application 105 may include an authentication module 106 and a ticket distribution module 107.

The authentication module 106 may be used to authenticate the identity of the various entities taking part in a request for brokering limited access to a service device. For example, as will be discussed in greater detail, the authentication module 106 may be configured to, among other things, verify a request for limited access by authenticating identities of the requesting entity (e.g., the request device 30 (FIG. 1)), the intermediary entity (e.g., the intermediary device 20 (FIG. 1)), and the service device (e.g., the service device 40 (FIG. 1)) to ensure that the request is proper.

Upon authentication of the relevant devices, the ticket distribution module 107 may be configured to receive the request for access, and if appropriate, provide limited access to a service device. In this example, the ticket distribution module 107 may be a Kerberos Key Distribution Center (KDC).

The preparatory ticket 108 may be a message that may be issued in anticipation of issuing limited access to a service device via an intermediary device. In one example, the preparatory ticket 108 may be encrypted, and may be transmitted to an intermediary device. Upon the successful decryption and return of the preparatory ticket 108 from the intermediary device, the control device 100 may prepare to issue limited access to a service device. In particular, the control device 100 may prepare to provide access to a request device using the intermediary device as a verified intermediary.

The access ticket 109 may be a message that is used to provide access of a service device to a request device. The access ticket 109 may be transmitted to an intermediary device, and as will be discussed in greater detail, may include information regarding the scope and nature of the granted limited access. Upon receiving the access ticket 109, the intermediary device may transmit the access ticket 109 to a request device, which may then use the access ticket 109 to gain limited access of a service device.

Figure 3:
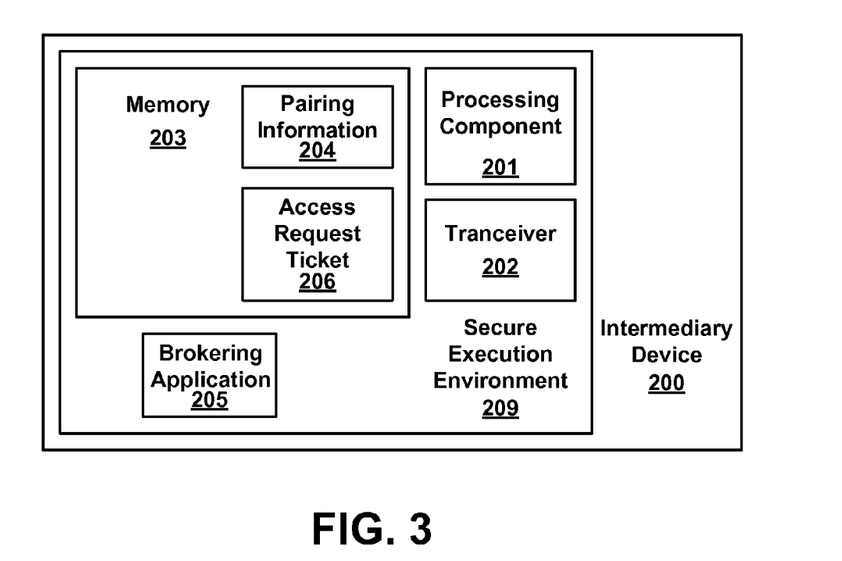
FIG. 3 is a block diagram of an example of a control device in accordance with an embodiment of the invention.

Turning now to FIG. 3, a block diagram of an intermediary device 200 is shown. The intermediary device 200 may be any programmable machine that may carry out a sequence of logical operations to request access to a service device on behalf of a request device. In this example the intermediary device 200 may be a smart phone, like that of a parent requesting control of a vehicle on behalf of their child. Other examples of the intermediary device 200 may include a laptop, desktop, PDA, media player, MID, any smart device such as a smart phone, smart tablet, smart TV, or the like. The intermediary device 200 may include a processing component 201, a transceiver 202, and a memory device 203.

The processing component 201 may include at least one computer processor that may be utilized to execute computer-readable executable instructions. For example, as will be discussed in greater detail, the processing component 201 may be configured to execute various software applications relating to brokering limited access to a service device via an intermediary.

The transceiver 202 may be a transmitter/receiver that enables the intermediary device 200 to wirelessly communicate with other devices (e.g., a control device, a request device, etc.). In this example, the transceiver 202 may be configured to communicate via a Wi-Fi connection (e.g., with a request device) and NFC protocol (e.g., with a control device). The transceiver 202 may also be configured to communicate via Bluetooth, Zigbee, a cellular telephone connection, a wired data connection, etc., depending upon the circumstances.

The memory device 203 may be any device configured to store data. In this case, the computing device memory device 203 may store, among other things, pairing information 204 and an access request ticket 206.

Similar to the pairing information 104 (FIG. 2), the pairing information 204 may include information relating to a pairing process conducted between the intermediary device 200, a control device and a service device.

A brokering application 205 may be configured to broker a request for access between a request device and a service device. In this example, the brokering application 205 may be Kerberos-enabled, in that it may be configured to implement the Kerberos protocol as part of an authentication and access process.

Furthermore, the brokering application 205 may provide an interface that a user of the intermediary device 200 may use to request limited access to a service device. So, for example, an individual using the intermediary device 200 may use the brokering application 205 to view a list of people and/or (related) devices on whose behalf the individual may wish to request access.

The access request ticket 206 may be an electronic file that is used to provide information relating to a request for limited access of a service device on behalf of a request device. So, for example, the access request ticket 206 may include an identification (ID) of the request device. Also, the access request ticket 206 may include information relating to a scope of the requested access. So, in the case of the vehicle owned by a parent, the parent may be able to limit the child's access to the vehicle by time (e.g., valid for a period of thirty minutes), distance (e.g., valid for a radial distance of twenty miles and a total of fifty miles), or any other relevant criteria.

Upon identification of a proper request device and description of a requested scope of limited access, the brokering application 205 may transmit the access request ticket 206 to a control device, such as the control device 10 (FIG. 1). The control device may use the access request ticket 206 to generate an access ticket, such as the access ticket 109 (FIG. 2).

The intermediary device 200 may also include a secure execution environment 209. The secure execution environment 209 may be a set of hardware and software enhancements that may allow for secure execution. For example, the secure execution environment 209 may be used to secure communications between the intermediary device 200 and the request device 300.

Figure 4:
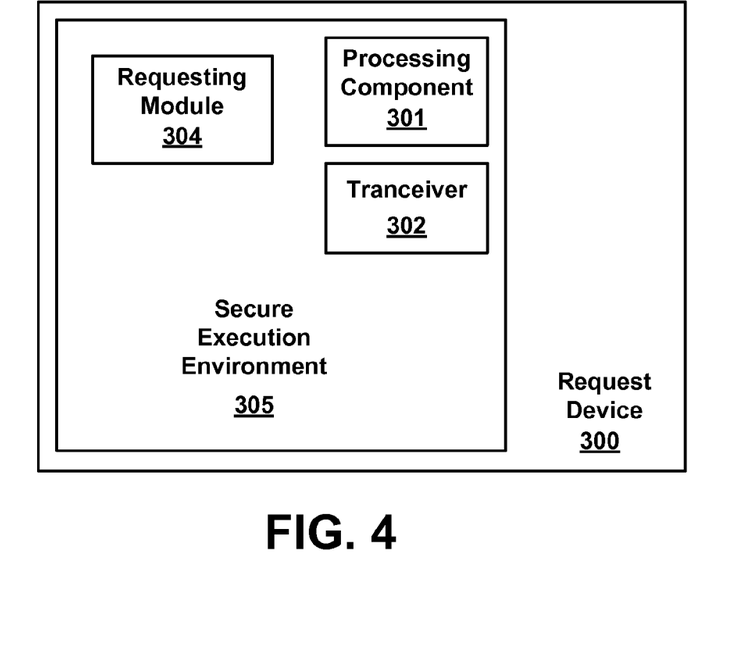
FIG. 4 is a block diagram of an example of a request device in accordance with an embodiment of the invention.

Turning now to FIG. 4, a block diagram of a request device 300 is shown. The request device 300 may be any programmable machine that may carry out a sequence of logical operations to request access to a service device. In this example the request device 300 may be a smart phone, like that of a child requesting control of a parent's vehicle. Other examples of the intermediary device 200 may include a laptop, desktop, PDA, media player, MID, any smart device such as a smart phone, smart tablet, smart TV, or the like. The request device 300 may include a secure execution environment 305 having a processing component 301 and a transceiver 302.

The processing component 301 may include at least one computer processor that may be utilized to execute computer-readable executable instructions. For example, as will be discussed in greater detail, the processing component 301 may be configured to execute various software applications relating to requesting limited access to a service device via an intermediary.

The transceiver 302 may be a transmitter/receiver that enables the request device 300 to wirelessly communicate with other devices (e.g., the intermediary device, the service device, etc.). In this example, the transceiver 302 may be configured to communicate via a Wi-Fi connection (e.g., with an intermediary device) and near-field communication protocol (e.g., with a service device). The transceiver 202 may also be configured to communicate via Bluetooth, Zigbee, a cellular telephone connection, a wired data connection, etc., depending upon the circumstances.

As will be discussed in greater detail, a requesting module 304 may be configured to request access to the service device 400. In this example, the requesting module 304 may be Kerberos-enabled, in that it may be configured to implement the Kerberos protocol as part of an authentication and access process.

In particular, the requesting module 304 may be used to communicate with an intermediary device and a service device to gain access to the service device. So, in the case of the child requesting access a vehicle from a parent, the child may use the requesting module 304 to communicate a request for access to an intermediary device (e.g., a parent's smart phone), and receive an access ticket, such as the access ticket 109 (FIG. 2), transmitted from the intermediary device. The child may then use the brokering application to communicate a request to the vehicle and present the access ticket to authenticate the request.

The secure execution environment 305 may be a set of hardware and software enhancements that may allow for a secure execution. For example, the secure execution environment 305 may be used to create a secure connection between the intermediary device 200 and the request device 300.

Figure 5:
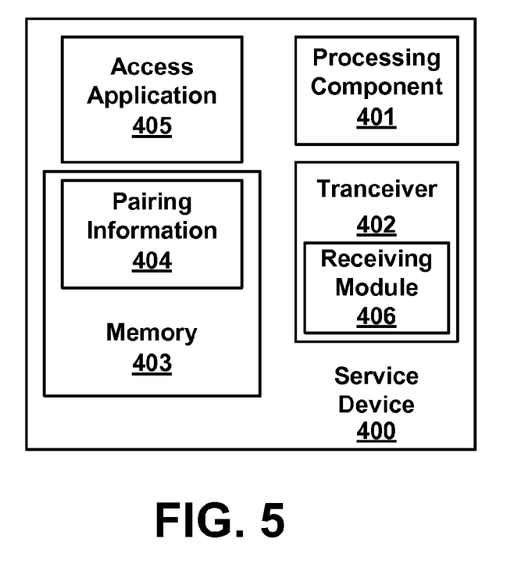
FIG. 5 is a block diagram of an example of a service device in accordance with an embodiment of the invention.

Turning now to FIG. 5, a block diagram of a service device 400 is shown. The service device 400 may be any programmable machine that may carry out a sequence of logical operations to perform a function. In addition, the service device 400 may be configured to receive a request for limited access, and if appropriate, grant limited access to a requesting party. For example, the service device 400 may be a vehicle.

The service device 400 may include a processing component 401, a transceiver 402, and a memory device 403. The processing component 401 may include at least one computer processor that may be utilized to execute computer-readable executable instructions. For example, as will be discussed in greater detail, the processing component 401 may be configured to execute various software applications relating to granting limited access to a service device.

The transceiver 402 may be a transmitter/receiver that enables the service device 400 to wirelessly communicate with other devices (e.g., the request device 300, etc.). In this example, the transceiver 402 may be configured to communicate via near-field communication protocol (e.g., with a request device). The transceiver 202 may also be configured to communicate via Bluetooth, Zigbee, a cellular telephone connection, a wired data connection, etc., depending upon the circumstances. In one example, the transceiver 402 comprises a receiving module 406 to receive a request communication from a request device, wherein the request communication includes a request of limited access of the service. The request communication may also include an access ticket originating at a control device and sent via an intermediary device.

The memory device 403 may be any device configured to store data. In this case, the computing device memory device 403 may store, among other things, pairing information 404.

Similar to the pairing information 104 (FIG. 2), the pairing information 404 may include information relating to a pairing process conducted between an intermediary device, a control device and the service device 400.

As will be discussed in greater detail, an authentication module 405 may be configured to grant access to the service device 400. More particularly, the illustrated authentication module 405 may authenticate the request of the limited access to the service device to allow limited access of the service device by the request device. In doing so, the access application 405 may be configured to implement an authentication and access protocol to request or grant access from the control device. So, in the case of a child requesting access to a vehicle, the vehicle may utilize the access application 405 to authenticate an access ticket presented by the child's request device (i.e., verify that the access ticket originates from a previously paired control device), and upon authentication, grant access to the child according to the scope defined in the access ticket.

Figure 6:
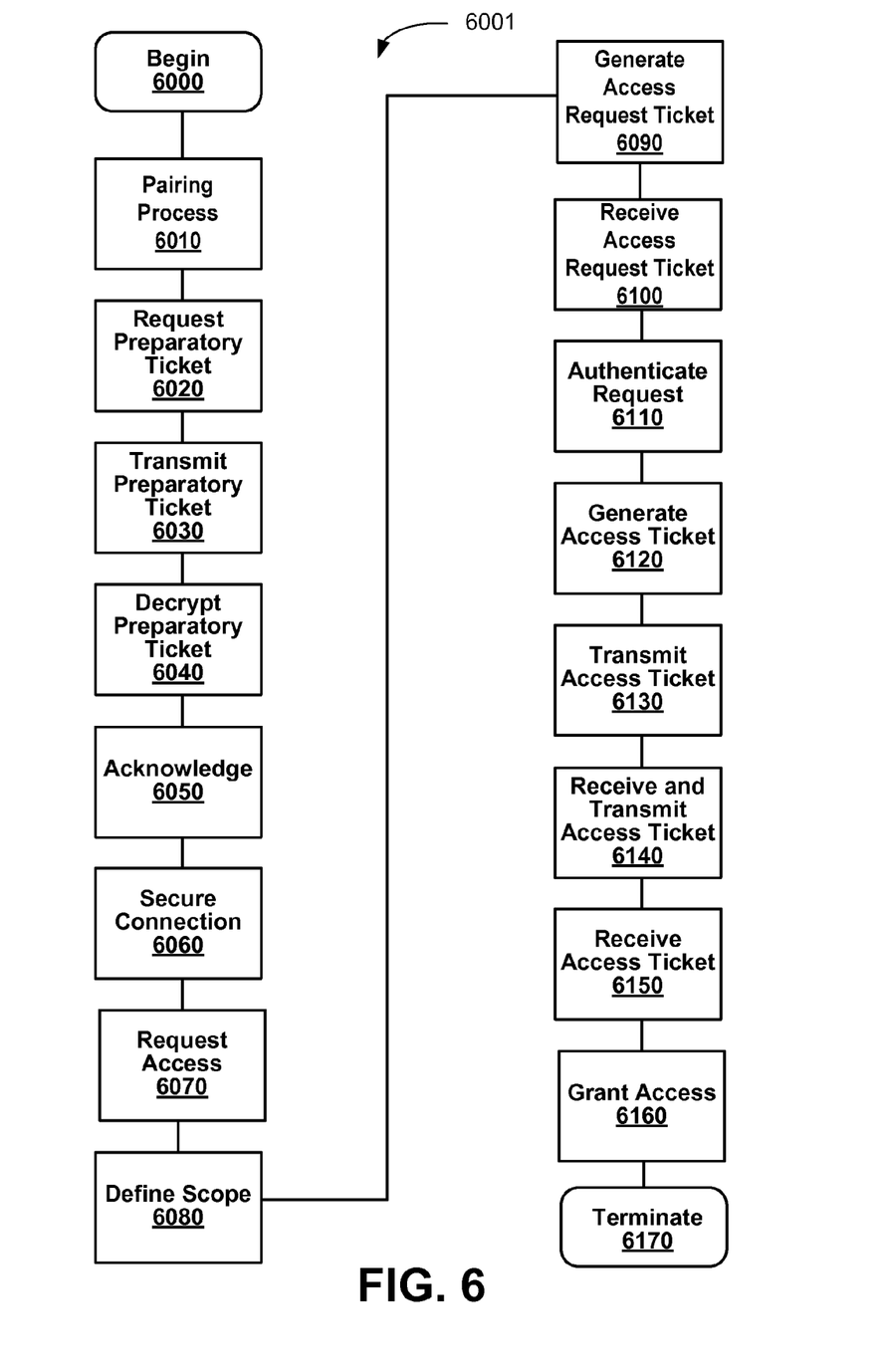
FIG. 6 is a flowchart of an example of a method of providing access to a service device via an intermediary in accordance with an embodiment of the invention.

Turning now to FIG. 6, a flowchart of an example of a method 6001 of implementing a dynamic brokering service in accordance with an embodiment of the invention is shown. In this example, a parent may utilize a smart phone, such as the intermediary device 20 (FIG. 1), to request access of a vehicle, such as the service device 40 (FIG. 1), on behalf of a child. The parent may send a request to a remote keyless access device, such as the control device 10 (FIG. 1) to request access on the child's behalf Her daughter may utilize her smart phone, such as the request device 30 (FIG. 1), to communicate with the parent's smart phone to request access, and to communicate with the vehicle to gain access. The remote keyless access device may utilize Kerberos, and the parent's smart phone and the daughter's smart phone may be Kerberos-enabled.

The method 6001 might be implemented as a set of logic instructions stored in a machine- or computer-readable medium such as random access memory (RAM), read only memory (ROM), programmable ROM (PROM), firmware, flash memory, etc., in configurable logic such as programmable logic arrays (PLAs), field programmable gate arrays (FPGAs), complex programmable logic devices (CPLDs), in fixed-functionality logic hardware using circuit technology such as application specific integrated circuit (ASIC), complementary metal oxide semiconductor (CMOS) or transistor-transistor logic (TTL) technology, or any combination thereof. For example, computer program code to carry out operations shown in the method 6001 may be written in any combination of one or more programming languages, including an object oriented programming language such as Java, Smalltalk, C++ or the like and conventional procedural programming languages, such as the "C" programming language or similar programming languages.

The process may begin at processing block 6000. At processing block 6010, the parent's smart phone, the remote keyless access device, and the vehicle may engage in a preliminary pairing process. The pairing process may include sharing pairing information, such as the pairing information 104 (FIG. 2), 204 (FIG. 3), and 404 (FIG. 4), between the parent's smart phone, the remote keyless access device, and the vehicle.

At processing block 6020, the parent may, thorough a brokering application located on the smart phone, such as the brokering application 205 (FIG. 1), request a preparatory ticket, such as the preparatory ticket 208 (FIG. 1), from the remote keyless entry device in anticipation of requesting an access ticket. The brokering application may be Kerberos-enabled.

At processing block 6030, the control device may transmit the preparatory ticket in an encrypted form to the parent's smart phone. At processing block 6040, the brokering application may decrypt the preparatory ticket, and transmit it back to the remote keyless entry device. At processing block 6050, upon receiving the decrypted preparatory ticket, the remote keyless entry device may acknowledge that the parent's smart phone may be used to request limited access to the vehicle.

At this point, the parent may receive a request from the child for temporary access to the vehicle (e.g., via a phone call). As such, at processing block 6060, the parent may use the brokering application to create a secure connection with the child's smart phone, over which communications regarding the brokered access may take place. In this example, the parent's smart phone and the child's smart phone may create a secure connection using a Diffie-Hellman key exchange.

At processing block 6070, the parent may use the brokering application to communicate with the remote keyless entry device to request access on behalf of her daughter. In this example, the brokering application may include a list of people (and affiliated devices) on whose behalf the parent may be willing to request permission. This list may include the daughter, and may include her smart phone. The parent may select the daughter's smart phone as a request device on whose behalf the request for limited use of the vehicle is being made.

At processing block 6080, the parent may use the brokering application to define the scope of the limited use of the vehicle. For example, the parent may define that access should be provided to the daughter (i.e., through the daughter's smart phone), that the access to vehicle should active for a period of one hour. The access may also be limited by, for example, a total driving distance (e.g., the vehicle may be driven for a total of fifty miles), and a total radial distance from a particular location (e.g., a radius of thirty miles from the parent/child's home).

At processing block 6090, the brokering application may generate an access request ticket, such as the access request ticket 107 (FIG. 1), detailing the requested access and transmit it to the control device. The access request ticket may also include identification information that the remote keyless access device may use to identify and authenticate the parent's smart phone.

At processing block 6100, the remote keyless access device may receive the access request ticket. At processing block 6110, the remote keyless access device may utilize an authentication module, such as the authentication module 106 (FIG. 1), of an authentication and access application, such as the authentication and access application 105 (FIG. 1), to authenticate the identity of the parent's smart phone as a legitimate requesting entity. As discussed above, in this example the authentication and access application may be a Kerberos-enabled application.

At processing block 6120, upon authentication, the remote keyless access device may utilize a ticket distribution module, such as the ticket distribution module 107 (FIG. 1), to generate an access ticket that provides access to the vehicle. In this example, the ticket distribution module 206 may be a Kerberos Key Distribution Center (KDC). The access ticket may include the limitations to the access defined by the parent. The remote keyless access device may transmit the access ticket to the parent's smart phone.

At processing block 6130, the parent's smart phone may transmit the access ticket to the child's smart phone over the previously-established secure connection. At processing block 6140, the child's smart phone may receive the access ticket. The child's smart phone may utilize a requesting application, such as the requesting module 304 (FIG. 4), to transmit the access ticket to the service device. As discussed above, in this example the authentication and access application may be a Kerberos-enabled application.

At processing block 6150, the vehicle may receive the access ticket. At processing block 6160, an access application, such as the access application 405 (FIG. 5), on the vehicle may authenticate the access ticket by verifying that the access ticket originated at the control device (i.e., using the pairing information of processing block 2010). As discussed above, in this example the access application may be a Kerberos-enabled application. Upon authentication, the access application may recognize the request device as a device that has been delegated access, and may grant access to the child according to the limited terms included in the access ticket.

At processing block 6170, the process may terminate.

The sequence and numbering of blocks depicted in FIG. 6 is not intended to imply an order of operations to the exclusion of other possibilities. Those of skill in the art will appreciate that the foregoing systems and methods are susceptible of various modifications, variations, and alterations.

For example, in the embodiment described in FIG. 6, at processing block 6070, the parent may use the brokering application to select the daughter's smart phone as a request device on whose behalf the request for limited use of the vehicle is being made. However, this need not necessarily be the case. In another example, the child may transmit a request communication (e.g., via a requesting application) to the intermediary device, which may be used to automatically populate a request at the brokering application on the intermediary device.

Also, for example, in the embodiment described in FIG. 6, the requesting application of a request device may be Kerberos enabled (i.e., the processing block 6140). The child may use the Kerberos enabled requesting application to gain access to the vehicle. However, this need not always be the case. In another example, the request device may not necessarily be enabled with an authentication client with which to request limited access. Take, for example, the case of a salesperson selling a vehicle to a customer. The customer may walk into the salesperson's car lot randomly, and may not necessarily utilize a smart phone (i.e., a request device) that is enabled with an authentication client.

Nevertheless, in this case, the salesperson may ask the customer to download an application to her smart phone. The application may also bring up a device identification number (e.g., a phone number) of a smart phone of the salesperson (i.e., the intermediary device). The application may use this number to create a secure connection between the customer's smart phone and the salesperson's smart phone (i.e., similar to processing block 6060). In addition, the application may be configured to take part in an authentication and access process that would allow the salesperson to request access on behalf of the customer, and would allow the customer to gain limited access of the vehicle.

Also, in the example described in FIG. 6, one control device may share a relationship with one intermediary device and one service device. However, this need not necessarily be the case. For example, in the case of a car salesperson, the salesperson's phone may request access from multiple control devices (e.g., multiple remote keyless entry devices) for access to more than one vehicle. Or, in the alternative, a single control device (e.g., a computer device) could authenticate requests made pertaining to more than one vehicle (e.g., all of the cars on a salesperson's lot).

Also, for example, in the embodiment described in FIG. 6, the access application at the vehicle may authenticate the access ticket by determining that the access ticket originated at the control device (i.e., processing block 6160). However, this need not be the only information that may be verified. In another example, in addition to the origination information, the access application may compare a device identification number of the child's phone received during communications with a device identification number for the child's phone included in an access ticket generated by the keyless remote entry device. The keyless remote entry device may have received the device identification number of the child's phone, for example, in an access request ticket sent from the parent's phone.

Figure 7:
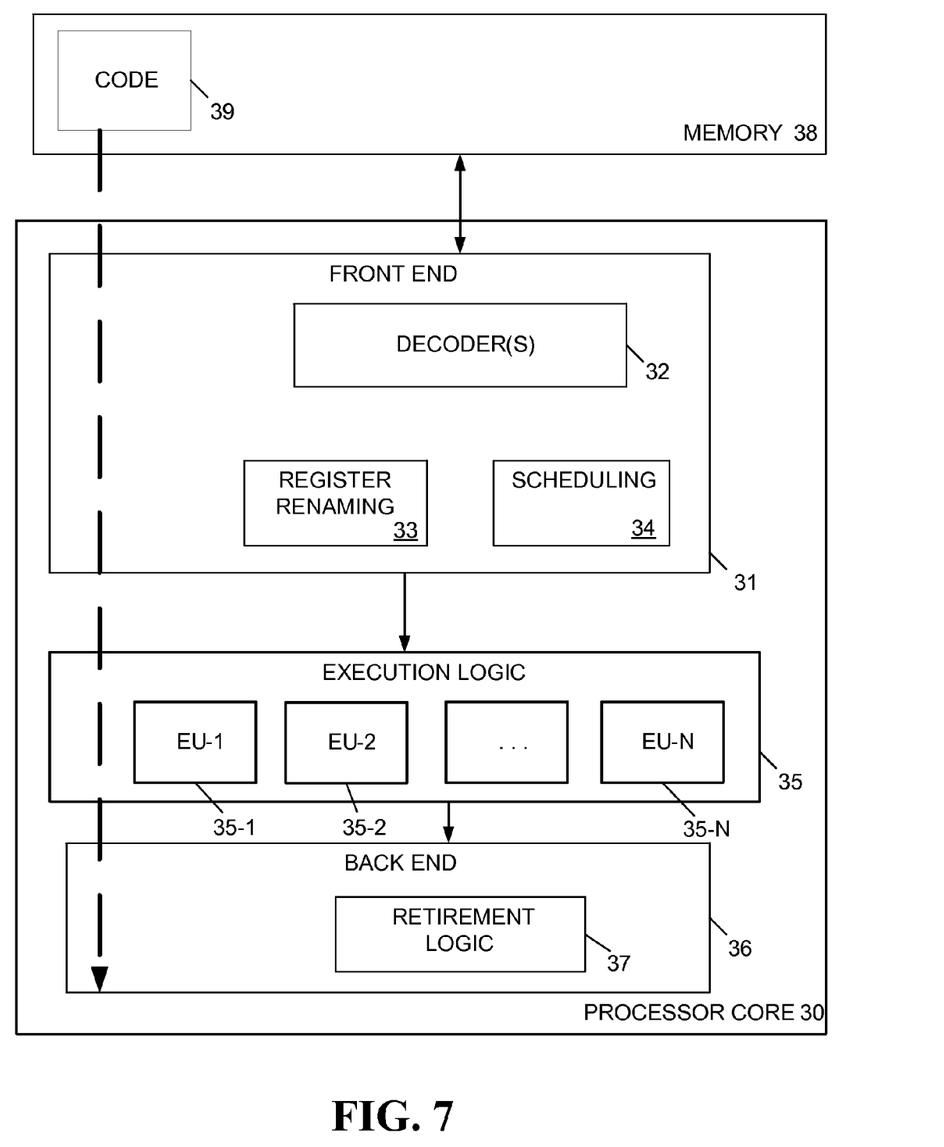
FIG. 7 is a block diagram of an example of a processor according to an embodiment.

FIG. 7 illustrates a processor core 30 according to one embodiment. The processor core 30 may be the core for any type of processor, such as a micro-processor, an embedded processor, a digital signal processor (DSP), a network processor, or other device to execute code. Although only one processor core 30 is illustrated in FIG. 7, a processing element may alternatively include more than one of the processor core 30 illustrated in FIG. 7. The processor core 30 may be a single-threaded core or, for at least one embodiment, the processor core 30 may be multithreaded in that it may include more than one hardware thread context (or "logical processor") per core.

FIG. 7 also illustrates a memory 38 coupled to the processor 30. The memory 38 may be any of a wide variety of memories (including various layers of memory hierarchy) as are known or otherwise available to those of skill in the art. The memory 38 may include one or more code 39 instruction(s) to be executed by the processor 30 core, wherein the code 39 may implement the one or more aspects of the method 6001 (FIG. 6), already discussed. The processor core 30 follows a program sequence of instructions indicated by the code 39. Each instruction may enter a front end portion 31 and be processed by one or more decoders 32. The decoder 32 may generate as its output a micro operation such as a fixed width micro operation in a predefined format, or may generate other instructions, microinstructions, or control signals which reflect the original code instruction. The illustrated front end 31 also includes register renaming logic 33 and scheduling logic 34, which generally allocate resources and queue the operation corresponding to the convert instruction for execution.

The processor 30 is shown including execution logic 35 having a set of execution units 35-1 through 35-N. Some embodiments may include a number of execution units dedicated to specific functions or sets of functions. Other embodiments may include only one execution unit or one execution unit that can perform a particular function. The illustrated execution logic 35 performs the operations specified by code instructions.

After completion of execution of the operations specified by the code instructions, back end logic 36 retires the instructions of the code 39. In one embodiment, the processor 30 allows out of order execution but requires in order retirement of instructions. Retirement logic 37 may take a variety of forms as known to those of skill in the art (e.g., re-order buffers or the like). In this manner, the processor core 30 is transformed during execution of the code 39, at least in terms of the output generated by the decoder, the hardware registers and tables utilized by the register renaming logic 33, and any registers (not shown) modified by the execution logic 35.

Although not illustrated in FIG. 7, a processing element may include other elements on chip with the processor core 30. For example, a processing element may include memory control logic along with the processor core 30. The processing element may include I/O control logic and/or may include I/O control logic integrated with memory control logic. The processing element may also include one or more caches.

Figure 8:
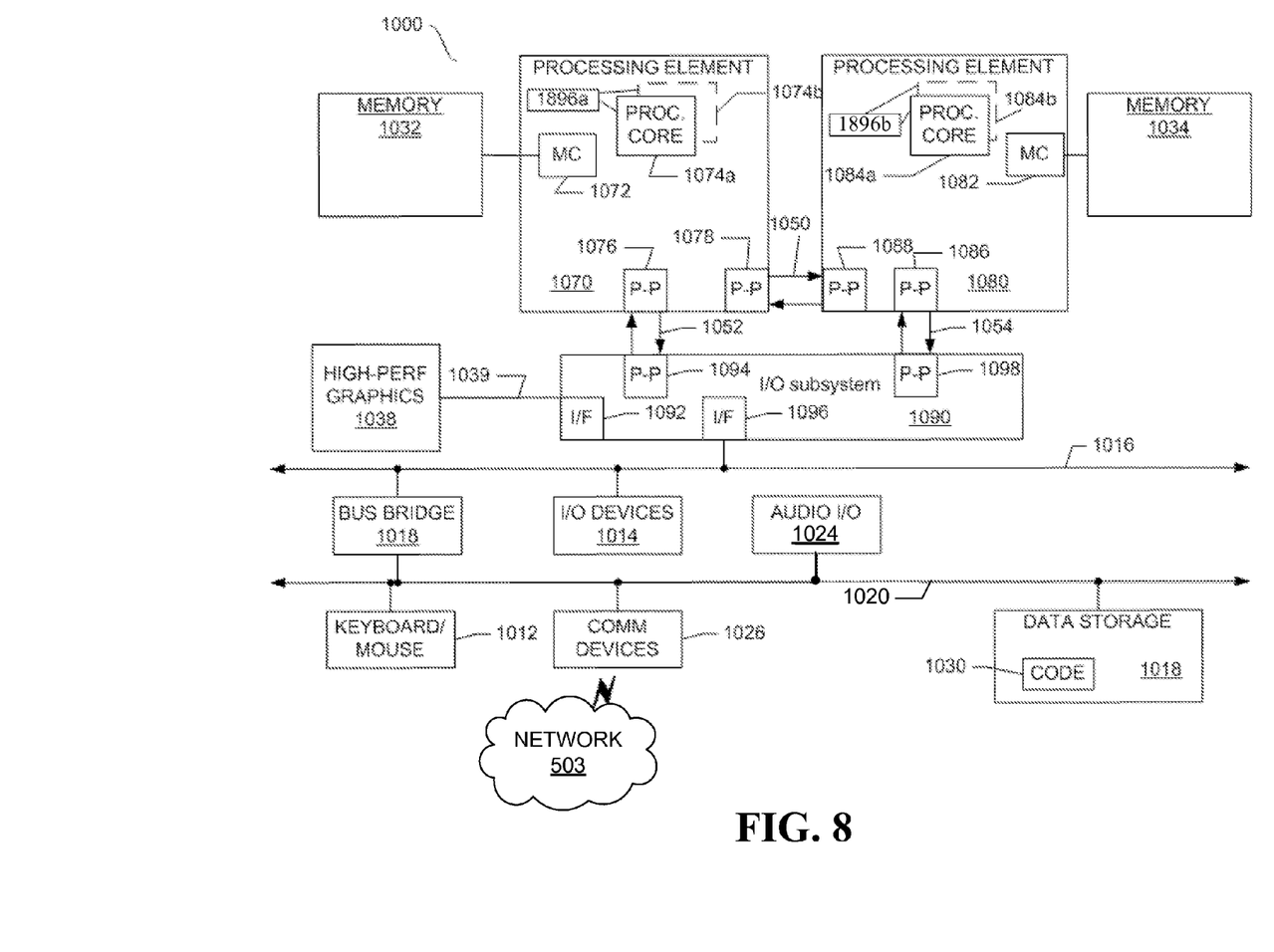
FIG. 8 is a block diagram of an example of a system according to an embodiment.

Referring now to FIG. 8, shown is a block diagram of a system embodiment 1000 in accordance with an embodiment of the present invention. Shown in FIG. 8 is a multiprocessor system 1000 that includes a first processing element 1070 and a second processing element 1080. While two processing elements 1070 and 1080 are shown, it is to be understood that an embodiment of system 1000 may also include only one such processing element.

System 1000 is illustrated as a point-to-point interconnect system, wherein the first processing element 1070 and second processing element 1080 are coupled via a point-to-point interconnect 1050. It should be understood that any or all of the interconnects illustrated in FIG. 8 may be implemented as a multi-drop bus rather than point-to-point interconnect.

As shown in FIG. 8, each of processing elements 1070 and 1080 may be multicore processors, including first and second processor cores (i.e., processor cores 1074a and 1074b and processor cores 1084a and 1084b). Such cores 1074, 1074b, 1084a, 1084b may be configured to execute instruction code in a manner similar to that discussed above in connection with FIG. 7.

Each processing element 1070, 1080 may include at least one shared cache 1896. The shared cache 1896a, 1896b may store data (e.g., instructions) that are utilized by one or more components of the processor, such as the cores 1074a, 1074b and 1084a, 1084b, respectively. For example, the shared cache may locally cache data stored in a memory 1032, 1034 for faster access by components of the processor. In one or more embodiments, the shared cache may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments of the present invention is not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, microarchitectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

First processing element 1070 may further include memory controller logic (MC) 1072 and point-to-point (P-P) interfaces 1076 and 1078. Similarly, second processing element 1080 may include a MC 1082 and P-P interfaces 1086 and 1088. As shown in FIG. 8, MC's 1072 and 1082 couple the processors to respective memories, namely a memory 1032 and a memory 1034, which may be portions of main memory locally attached to the respective processors. While the MC logic 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076, 1086 and 1084, respectively. As shown in FIG. 8, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple graphics engine 1038 to I/O subsystem 1090. Alternately, a point-to-point interconnect 1039 may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the present invention is not so limited.

As shown in FIG. 8, various I/O devices 1014 may be coupled to the first bus 1016, along with a bus bridge 1018 which may couple the first bus 1016 to a second bus 1010. In one embodiment, the second bus 1020 may be a low pin count (LPC) bus. Various devices may be coupled to the second bus 1020 including, for example, a keyboard/mouse 1012, communication device(s) 1026 (which may in turn be in communication with a computer network, 503), and a data storage unit 1018 such as a disk drive or other mass storage device which may include code 1030, in one embodiment. The code 1030 may include instructions for performing embodiments of one or more of the methods described above. Thus, the illustrated code 1030 may implement one or more aspects of the method 6001 (FIG. 6) and may be similar to the code 39 (FIG. 7), already discussed. Further, an audio I/O 1024 may be coupled to second bus 1020.

Note that other embodiments are contemplated. For example, instead of the point-to-point architecture of FIG. 8, a system may implement a multi-drop bus or another such communication topology. Also, the elements of FIG. 8 may alternatively be partitioned using more or fewer integrated chips than shown in FIG. 8.

Examples may include at least one computer readable storage medium having a set of instructions which, when executed by a processor, cause a control device to receive a request communication including a request of limited access of a service device at a control device, wherein the request is received from an intermediary device on behalf of a request device. The instructions may also cause the control device to transmit an access communication to the intermediary device, wherein the access communication includes an access ticket to be used by the request device to gain the limited access of the service device.

Additionally, the access ticket of the control device medium example may include a scope of the limited access of the service device, wherein the scope of limited access is based on an access request ticket included in the request communication.

Additionally, the scope of limited access of the service device in the control device medium example may be limited by one or more of time and distance.

Moreover, the instructions of any of the aforementioned medium examples may cause the control device to authenticate the request of the limited access of the service device at the control device using an authentication and access protocol.

In addition, the authentication and access protocol of any of the aforementioned control device medium examples may be Kerberos.

Examples may also include a method of operating a control device according to any of the aforementioned control device medium examples.

Examples may also include a control device having a request module to receive a request communication including a request of limited access of a service device at a control device, wherein the request is received from an intermediary device on behalf of a request device, and a transmit module to transmit an access communication to the intermediary device, wherein the access communication includes an access ticket to be used by the request device to gain the limited access of the service device.

Additionally, the access ticket of the control device may include a scope of the limited access of the service device, wherein the scope of the limited access is based on an access request ticket included in the request communication.

Additionally, the scope of limited access of the service device in the control device example may be limited by one or more of time and distance.

Moreover, any of the aforementioned control device examples may further include an authentication module to authenticate the request of the limited access of the service device at the control device using an authentication and access protocol.

In addition, the authentication and access protocol of any of the aforementioned control device examples may be Kerberos.

Examples may also include at least one computer readable storage medium having a set of instructions which, when executed by a processor, cause a service device to receive a request communication from a request device including a request of limited access of the service device, wherein the request communication includes an access ticket originating at a control device and sent via an intermediary device. The instructions may also cause the service device to authenticate the request of the limited access to the service device to allow the limited access of the service device by the request device.

Additionally, authenticating the request of the limited access to the service device to allow limited access in the service device medium example may include determining if the access ticket originated at the control device.

Additionally, the request of the limited access to the service device in the service device medium example may be authenticated using Kerberos.

Moreover, a scope of the limited access of the service device in any of the aforementioned service device medium examples may be limited by one or more of time and distance.

Examples may also include a method of operating a service device according to any of the aforementioned service device medium examples.

Examples may also include a service device having a receiving module to receive a request communication from a request device including a request of limited access of the service device, wherein the request communication includes an access ticket originating at a control device and sent via an intermediary device, and an authentication module to authenticate the request of the limited access to the service device to the allow limited access of the service device by the request device.

Additionally, authenticating the request of the limited access to the service device to allow limited access in the service device may include determining if the access ticket originated at the control device.

Additionally, the request of the limited access to the service device in any of the aforementioned service device examples may be authenticated using Kerberos.

Moreover, a scope of the limited access of the service device in any of the aforementioned service device examples may be limited by one or more of time and distance.

Examples may also include at least one computer readable storage medium having a set of instructions which, when executed by a processor, cause an intermediary device to receive a request communication from a request device, wherein the request communication includes a request of limited access of a service device, transmit an access request communication to a control device, wherein the access request communication includes an access request ticket describing a requested scope of the limited access of the service device, receive an access communication from the control device, wherein the access communication is to include an access ticket describing a granted scope of the limited access of the service device, and transmit an transfer communication to the request device, wherein the transfer communication is to include the access ticket.

Additionally, the instructions may cause the intermediary device to create a secure connection with the request device.

Additionally, the requested scope of the limited access of the service device in any of the aforementioned intermediary device medium examples may be limited by one or more of time and distance.

Moreover, the request communication, the access request communication, the access communication and the transfer communication in the intermediary device medium example may utilize an authentication and access protocol.

In addition, the authentication and access protocol in any of the aforementioned intermediary device medium examples may be Kerberos.

Examples may also include a method of operating an intermediary device in which a request communication is received from a request device, wherein the request communication includes a request of limited access of a service device. The method may also involve transmitting an access request communication to a control device, wherein the access request communication includes an access request ticket describing a requested scope of the limited access of the service device, receiving an access communication from the control device, wherein the access communication includes an access ticket describing a granted scope of the limited access of the service device, and transmitting an transfer communication to the request device, wherein the transfer communication includes the access ticket.

Additionally, the method may include creating a secure connection with the request device.

Additionally, the requested scope of the limited access of the service device may be limited by one or more of time and distance.

Moreover, the request communication, the access request communication, the access communication and the transfer communication in any of the aforementioned method examples may utilize an authentication and access protocol.

In addition, the authentication and access protocol may be Kerberos.

Examples may also include an intermediary device having means for performing any of the aforementioned intermediate device method examples.

Examples may also include at least one computer readable storage medium including a set of instructions which, if executed by a processor, cause a request device to communicate a first request for limited access of a service device to an intermediary device. The instructions, if executed, may also cause the request device to receive an access ticket from the intermediary device and communicate a second request to the service device, wherein the second request presents the access ticket to the service device.

Additionally, the access ticket in the aforementioned request device medium example may include a scope of the limited access of the service device.

Additionally, the scope of the limited access of the service device in the aforementioned request device medium example may be limited by one or more of time and distance.

Moreover, the instructions of the aforementioned request device medium example may be executed in a secure execution environment.

In addition, the instructions of the aforementioned request device medium example, if executed, may cause the request device to create a secure connection with the intermediary device.

In addition, the first request of any of the aforementioned request device medium examples may be communicated to the intermediary device via a telephone connection.

Examples may also include a method of operating a request device according to any of the aforementioned request device medium examples.

Examples may also include a request device having a transceiver to communicate a first request for limited access of a service device to an intermediary device, and a requesting module to receive an access ticket from the intermediary device via the transceiver. The requesting module may also use the transceiver to communicate a second request to the service device, wherein the second request presents the access ticket to the service device.

Additionally, the access ticket in the aforementioned request device example may include a scope of the limited access of the service device.

Additionally, the scope of the limited access of the service device in the aforementioned request device example may be limited by one or more of time and distance.

Moreover, the service device may include a secure execution environment that includes the requesting module.

In addition, requesting module may create a secure connection with the intermediary device.

In addition, the first request of any of the aforementioned request device examples may be communicated to the intermediary device via a telephone connection.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or rewriteable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A control device comprising:
 a request module to receive a request communication including a request of limited access of a service device comprising a vehicle at a control device comprising a remote keyless entry device, wherein the request is received from a mobile intermediary device on behalf of a mobile request device;

a transmit module to transmit an access communication to the mobile intermediary device, wherein the access communication includes an access ticket to be used by the mobile request device to gain the limited access of the service device; and an authentication module to authenticate the request of the limited access of the service device at the control device using an authentication and access protocol.

2. The control device of claim 1, wherein the access ticket includes a scope of the limited access of the service device, wherein the scope of the limited access is based on an access request ticket included in the request communication.

3. The control device of claim 2, wherein the scope of limited access of the service device is limited by one or more of time and distance.

4. The control device of claim 1, wherein the authentication and access protocol is Kerberos.

5. At least one non-transitory computer readable storage medium comprising a set of instructions which, when executed by a processor, cause a service device comprising a vehicle to:

receive a request communication from a mobile request device including a request of limited access of the service device, wherein the request communication includes an access ticket originating at a control device comprising a remote keyless entry device and sent via a mobile intermediary device; and authenticate the request of the limited access to the service device to allow the limited access of the service device by the mobile request device, wherein authenticating the request of the limited access to the service device to allow limited access is to include determining if the access ticket originated at the control device.

6. The at least one non-transitory computer readable storage medium of claim 5, wherein the request of the limited access to the service device is authenticated using Kerberos.

7. The at least one non-transitory computer readable storage medium of claim 5, wherein a scope of the limited access of the service device is to be limited by one or more of time and distance.

8. At least one non-transitory computer readable storage medium comprising a set of instructions which, when executed by a processor, cause a mobile intermediary device to:

receive a request communication from a mobile request device, wherein the request communication includes a request of limited access of a service device comprising a vehicle;

transmit an access request communication to a control device comprising a remote keyless entry device, wherein the access request communication includes an access request ticket describing a requested scope of the limited access of the service device;

receive an access communication from the control device, wherein the access communication is to include an access ticket describing a granted scope of the limited access of the service device; and transmit a transfer communication to the mobile request device, wherein the transfer communication is to include the access ticket and wherein the request communication, the access request communication, the access communication and the transfer communication utilize an authentication and access protocol.

9. The at least one non-transitory computer readable storage medium of claim 8, wherein, when executed, the set of instructions cause the mobile intermediary device to create a secure connection with the mobile request device.

10. The at least one non-transitory computer readable storage medium of claim 8, wherein the requested scope of the limited access of the service device is limited by one or more of time and distance.

11. The at least one non-transitory computer readable storage medium of claim 8, wherein the authentication and access protocol is Kerberos.

12. At least one non-transitory computer readable storage medium comprising a set of instructions which, when executed by a processor, cause a mobile request device to:

communicate a first request for limited access of a service device comprising a vehicle to a mobile intermediary device;

receive an access ticket from the mobile intermediary device, the access ticket being received at the mobile intermediary device on behalf of the mobile request device from a control device comprising a remote keyless entry device, wherein the access ticket includes a scope of the limited access of the service device; and Communicate a second request to the service device, wherein the second request presents the access ticket to the service device and wherein the instructions are to be executed in a secure execution environment.

13. The at least one non-transitory computer readable storage medium of claim 12, wherein the scope of the limited access of the service device is limited by one or more of time and distance.

14. The at least one non-transitory computer readable storage medium of claim 12, wherein the instructions, when executed, cause the mobile request device to create a secure connection with the mobile intermediary device.

15. The at least one non-transitory computer readable storage medium of claim 12, wherein the first request is to be communicated to the mobile intermediary device via a telephone connection.

* * * * *